US008253556B2

(12) United States Patent
Mizukami

(10) Patent No.: US 8,253,556 B2
(45) Date of Patent: Aug. 28, 2012

(54) PORTABLE COMMUNICATION TERMINAL WITH GPS FUNCTION

(76) Inventor: Toshihiko Mizukami, Osaka (JP)

( * ) Notice: Subject to any disclaimer, the term of this patent is extended or adjusted under 35 U.S.C. 154(b) by 672 days.

(21) Appl. No.: 11/991,457

(22) PCT Filed: Sep. 1, 2006

(86) PCT No.: PCT/JP2006/317322
§ 371 (c)(1),
(2), (4) Date: Aug. 26, 2009

(87) PCT Pub. No.: WO2007/029612
PCT Pub. Date: Mar. 15, 2007

(65) Prior Publication Data
US 2009/0322595 A1 Dec. 31, 2009

(30) Foreign Application Priority Data
Sep. 7, 2005 (JP) ................................ 2005-295595

(51) Int. Cl.
G08B 13/14 (2006.01)
G01S 19/16 (2010.01)
(52) U.S. Cl. ........... 340/539.13; 340/568.1; 340/539.32; 340/573.4; 340/574; 340/8.1; 455/404.2; 455/456.1; 342/357.54
(58) Field of Classification Search ............... 340/568.1, 340/539.11, 539.13, 539.32, 571, 573.1, 340/573.4, 8.1; 455/404.1–404.2, 456.1–457; 342/357.22, 357.54–357.57
See application file for complete search history.

(56) References Cited

U.S. PATENT DOCUMENTS
7,489,049 B2 * 2/2009 Komatsu et al. ............. 307/10.2
2005/0083195 A1 * 4/2005 Pham et al. ............... 340/539.13
2005/0149752 A1 * 7/2005 Johnson et al. ............... 713/201

OTHER PUBLICATIONS
Izumi (Matsushita Electric Ind Co Ltd), JP-2004-007194, Aug. 2004, (machine translation), Portable information terminal retrieval service system and portable information terminal; Abstract.*
Derwent Acc-No. 2002-596307; Choi (LG Electronics Inc), KR-2002-018255, Mar. 2002, (translation of abstract), Apparatus and method for transmitting position information of mobile communication terminal lost when turning on batterr power.*

* cited by examiner

Primary Examiner — George Bugg
Assistant Examiner — Anne Lai
(74) Attorney, Agent, or Firm — Kubotera & Associates, LLC

(57) ABSTRACT

This invention aims to provide a Mobile Communications Terminal (MCT) equipped with a GPS function that automatically transmits the information on the current position of the MCT after the power of the MCT is turned off. The MCT comprises a GPS Receiver Unit 105 for receiving signal data from a GPS satellite, a Position Determining Unit 107 for determining a current position of the MCT based on the aforesaid signal data, a Positional Information Transmitter Unit 108 for automatically transmitting information on the position obtained by the Position Determining Unit 107 and other information, a Controller Unit 104 for sending a request command to the Positional Information Transmitter Unit 108, and a Timer Circuit Unit 102 for turning on the MCT at a predetermined time interval, after power of the MCT is turned off.

This invention enables the MCT to automatically transmit the information on the position information and other information of the MCT at a predetermined time interval while the power of the MCT is on, and automatically transmit the information on the position information and other information of the MCT at the a predetermined time interval after the power of the MCT is turned off.

6 Claims, 8 Drawing Sheets

[FIG.1]
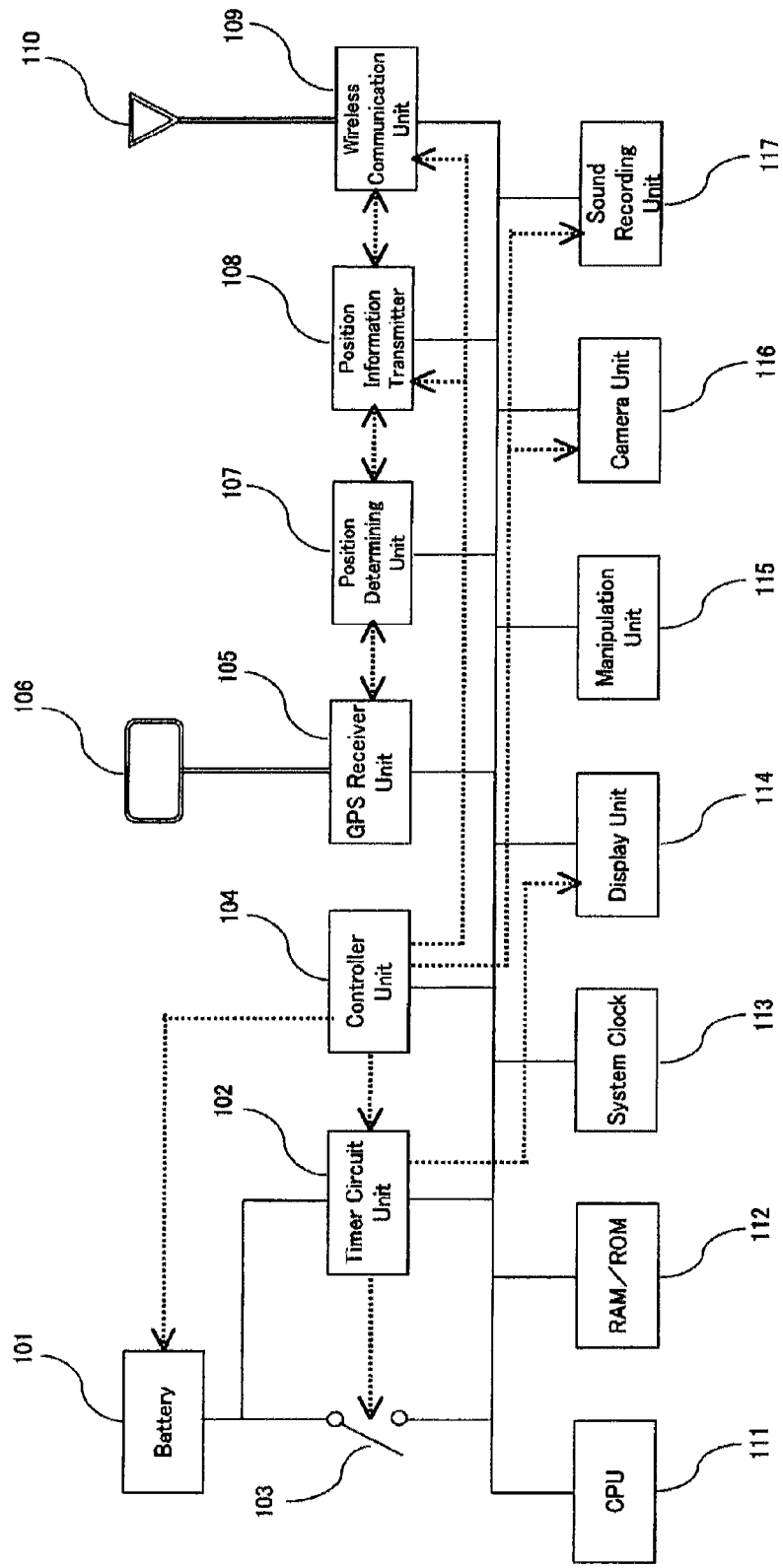

[FIG.2]
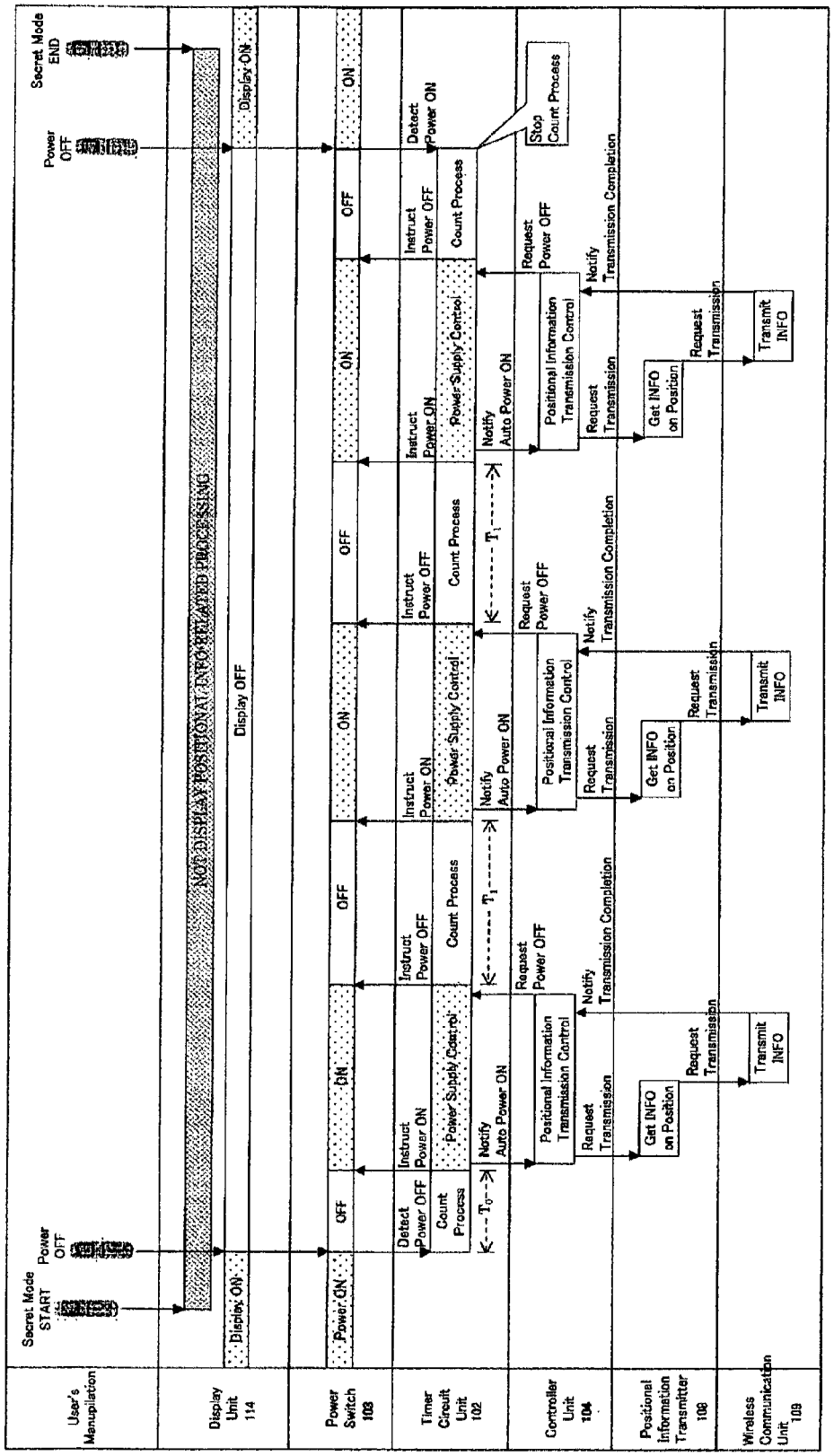

[FIG.3]
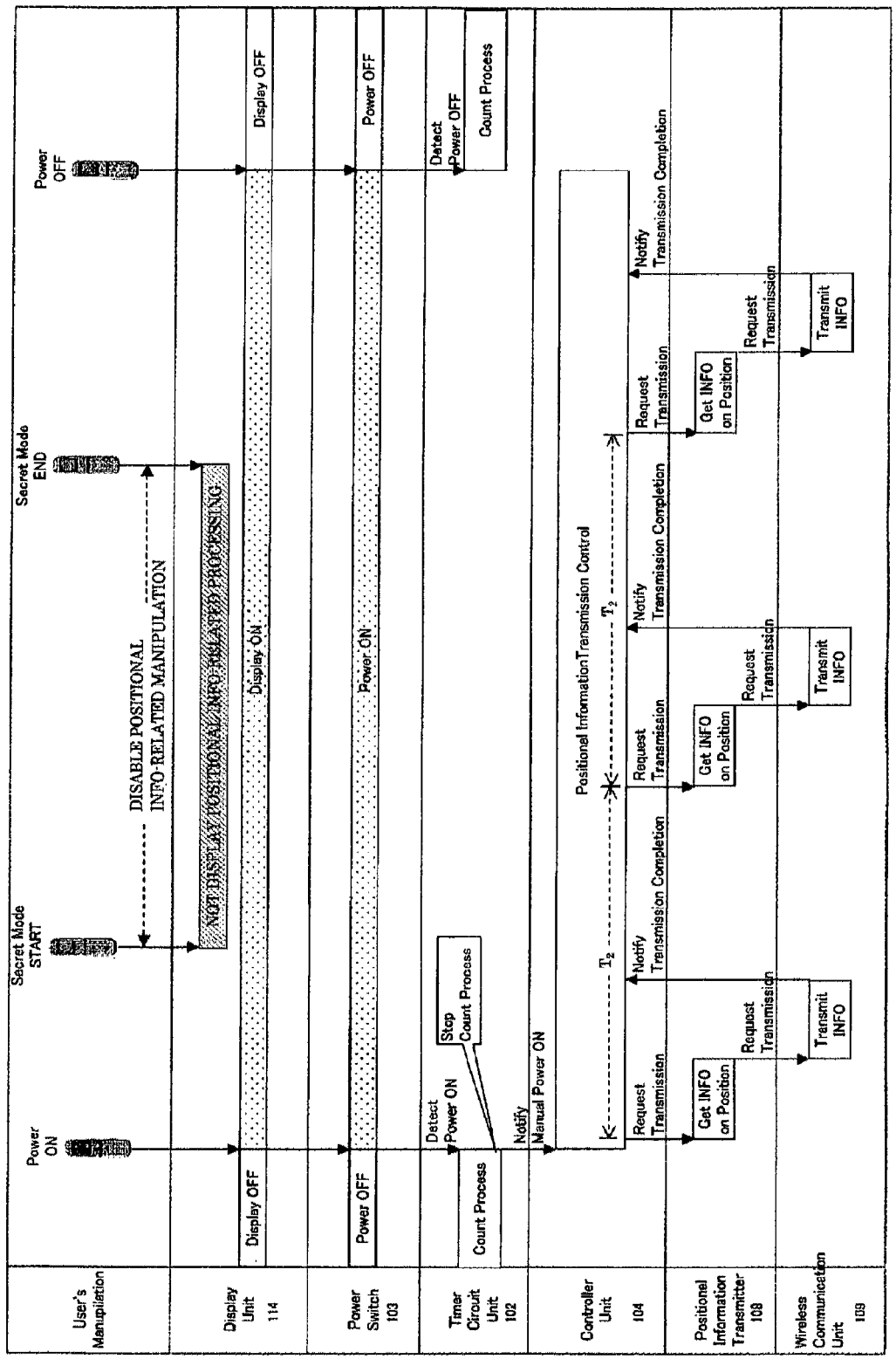

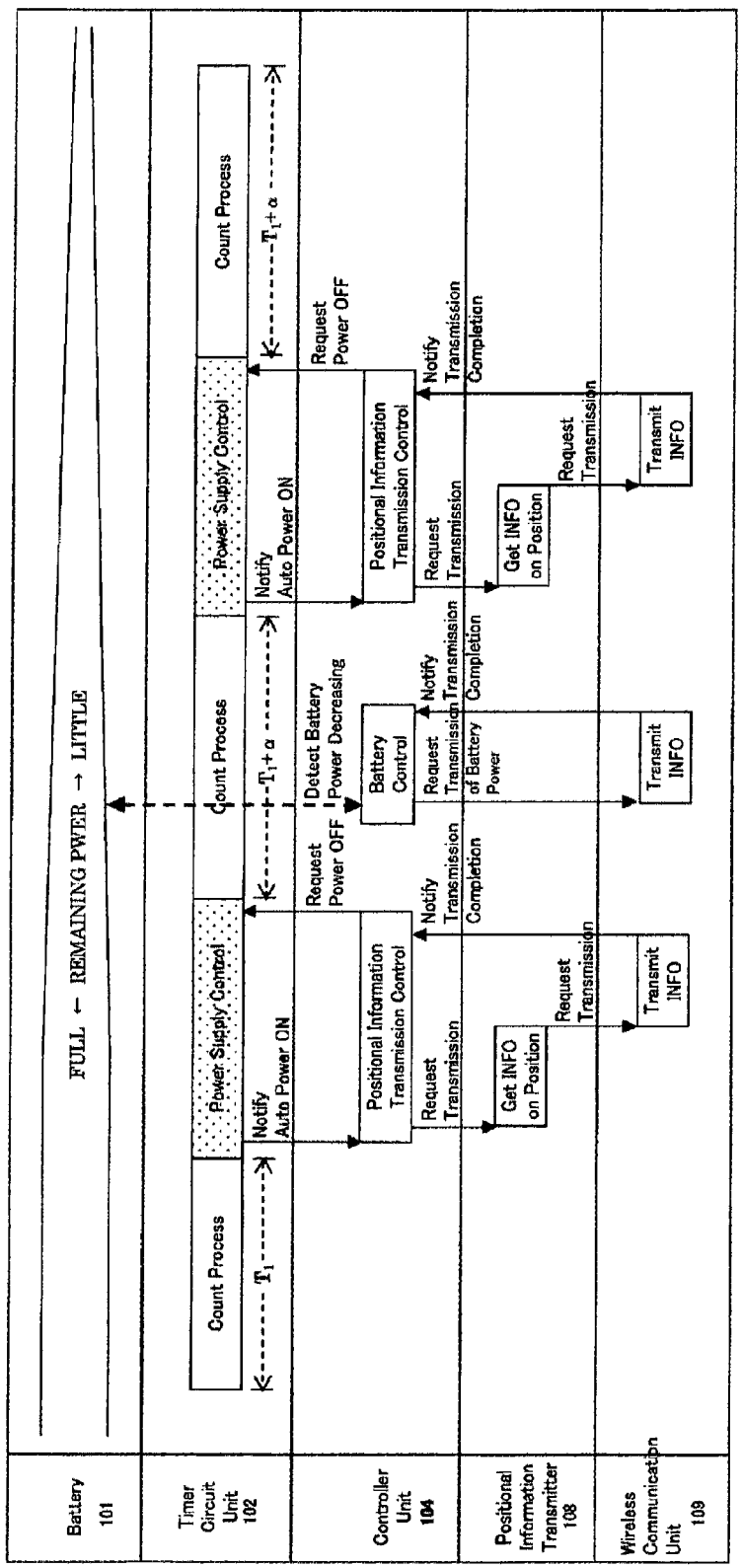
[FIG.4]

[FIG.5]
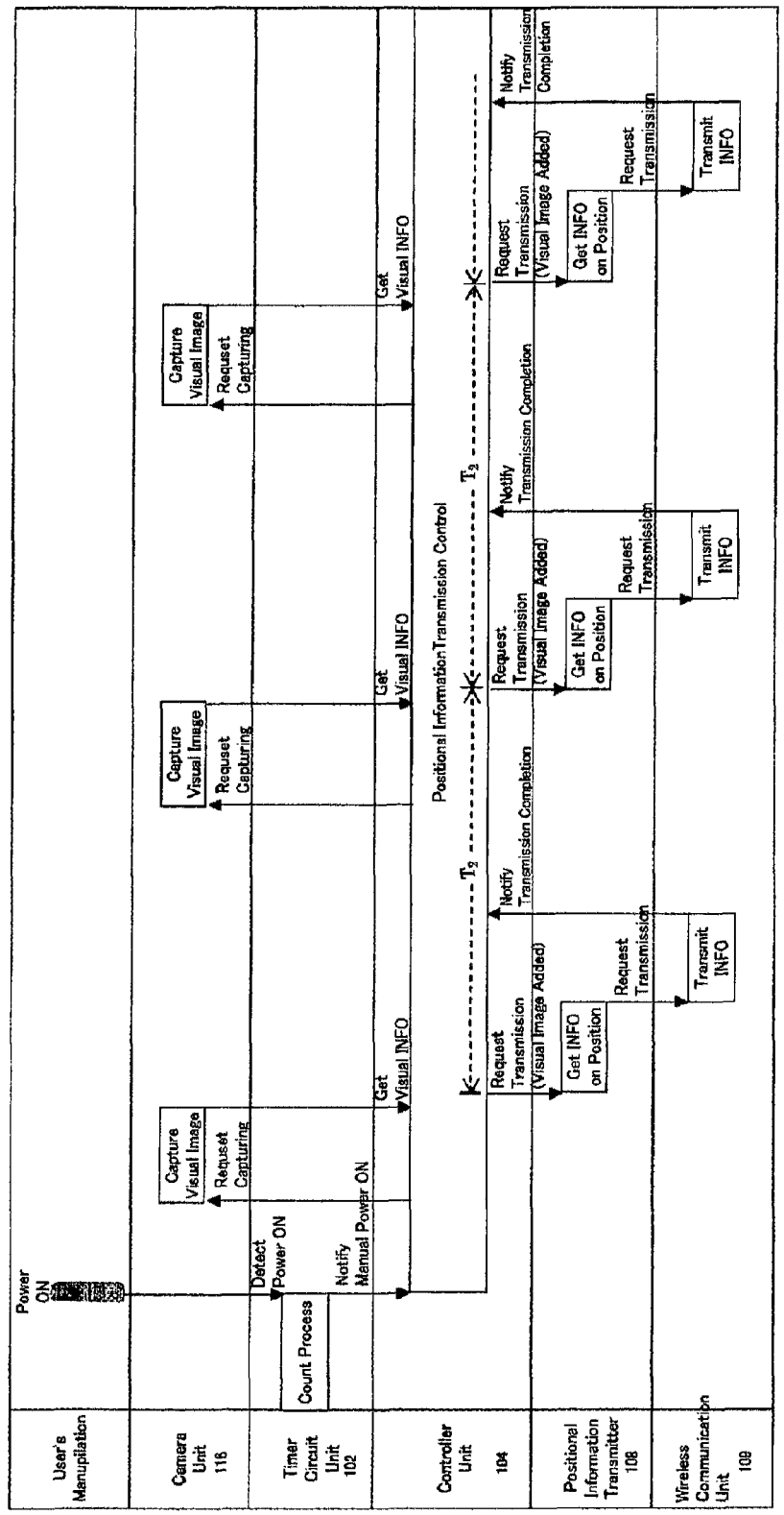

[FIG.6]
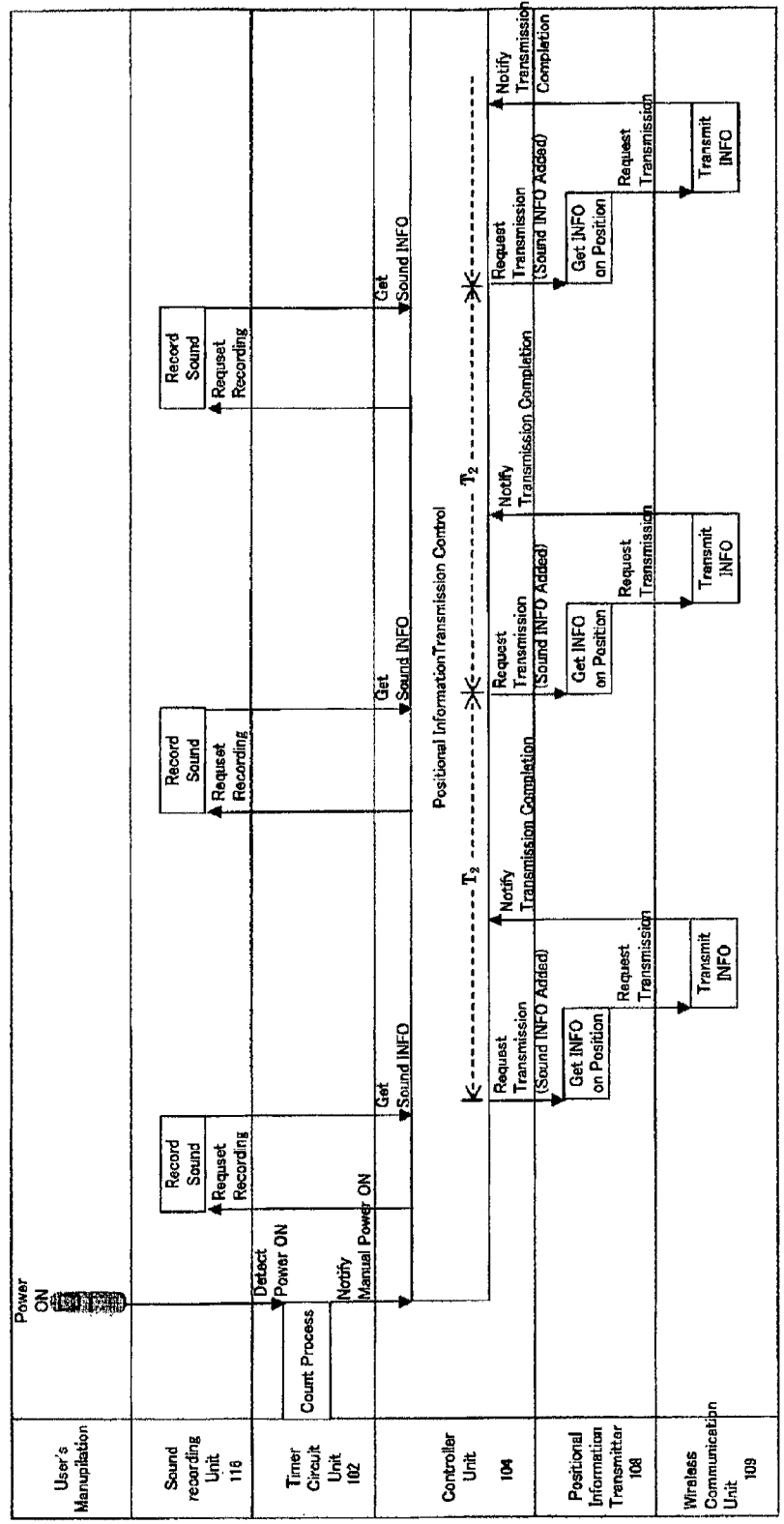

[FIG.7]
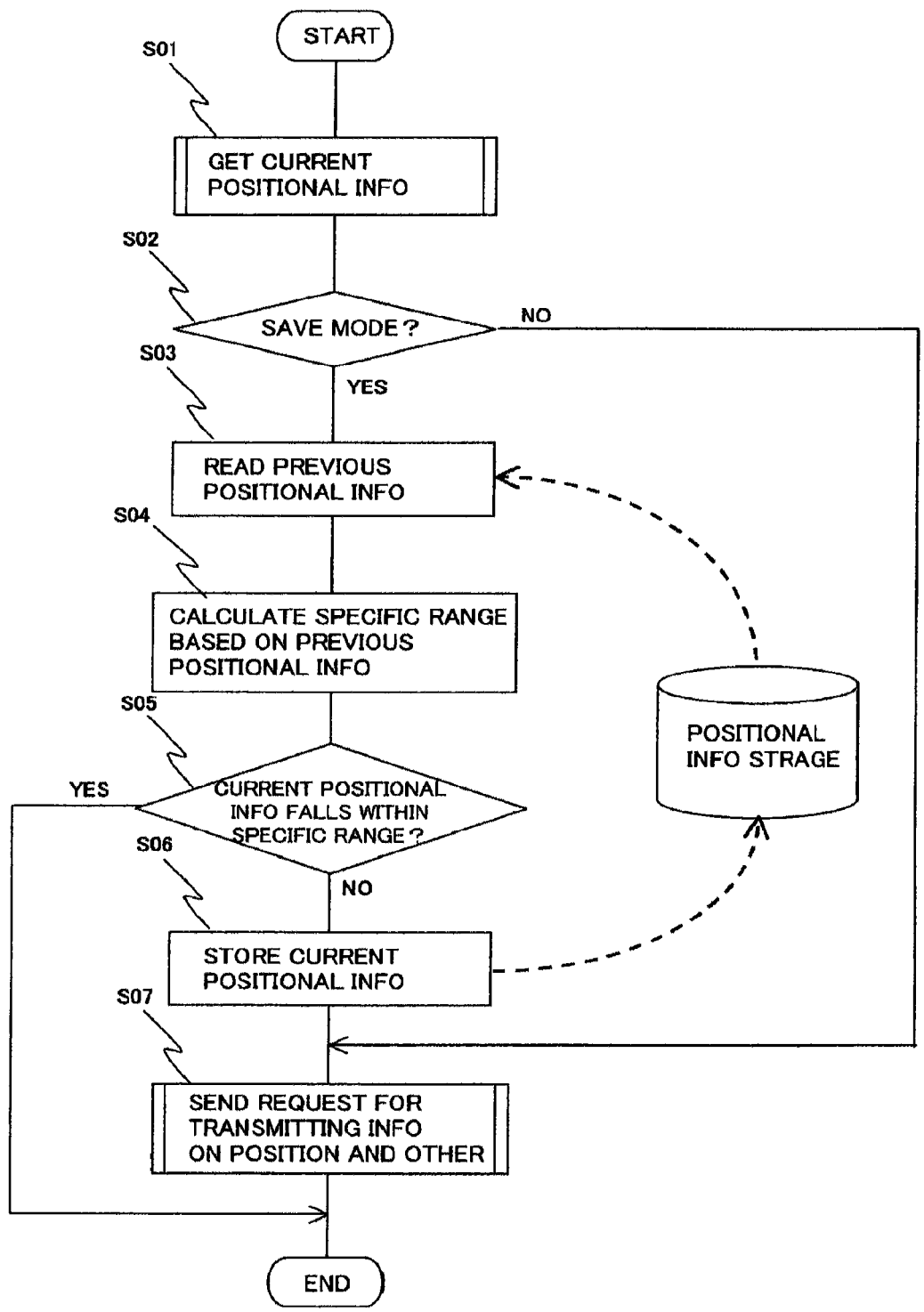

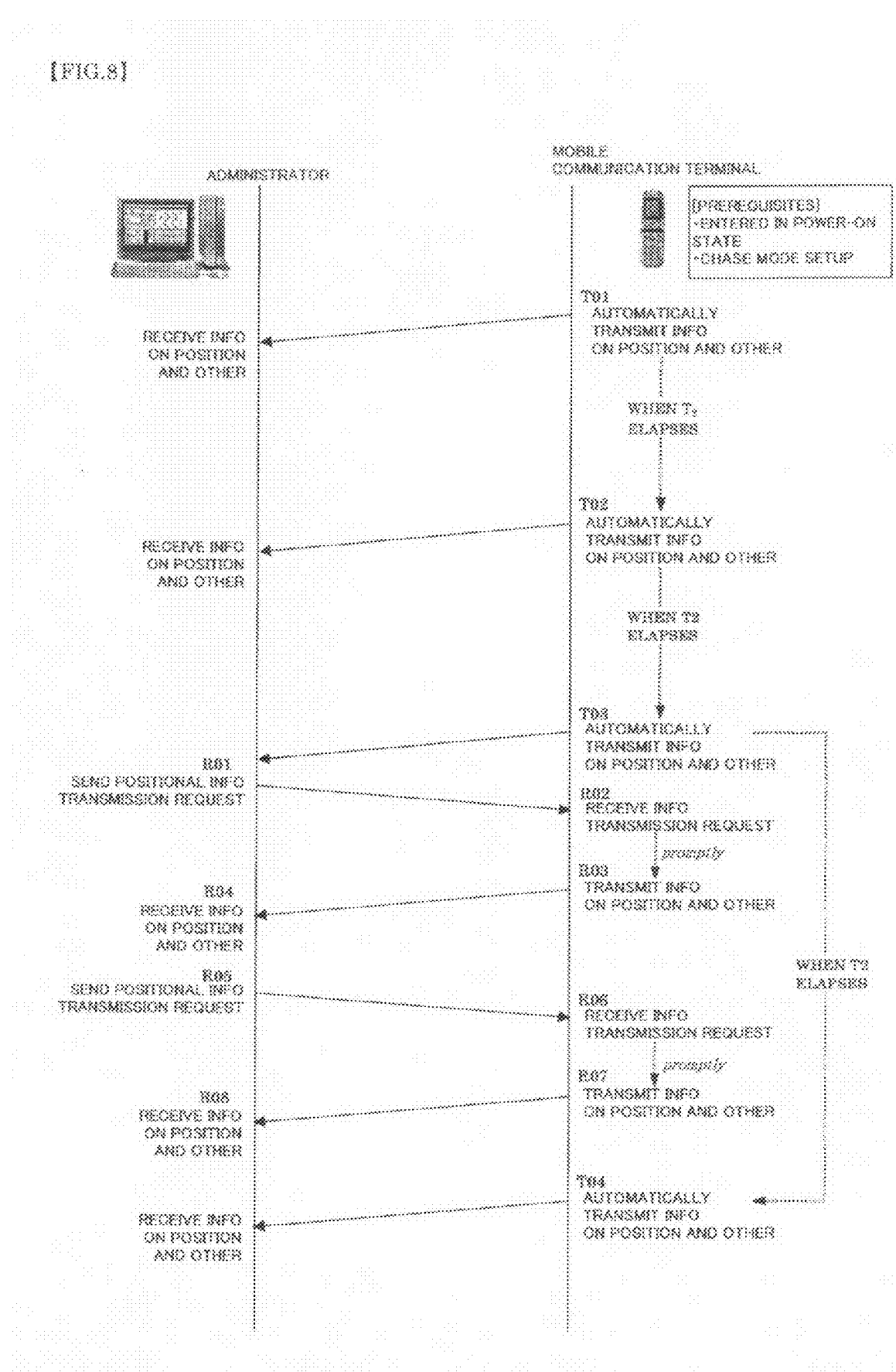
[FIG.8]

PORTABLE COMMUNICATION TERMINAL WITH GPS FUNCTION

TECHNICAL FIELD

The present invention relates to techniques for automatically transmitting positional information of mobile communications terminals such as cellular phones and the like to specific addresses by using a GPS (Global Positioning System) function.

BACKGROUND OF THE INVENTION

Recently mobile communications terminals including cellular phones equipped with a GPS function have come into widespread use, and a variety of applications of the technology can be observed. In some cases, the aforesaid terminals have been used to find whereabouts of wandering elderly people or missing children, and in other cases, used to search for stolen vehicles.

However, if the power of the mobile communications terminal equipped with a GPS function, which the user is always carrying, is intentionally cut off by someone else, the user's current location information cannot be known, and then there is a problem that the user's convenience and benefits is decreased. The term "intentionally" here refers to a case where a malicious person intends to commit a wrongdoing, disguising his or her current position by preventing the correct location of the phone from being known, which would remind us of criminal actions such as kidnappings, abductions, or captivities. On the other hand, there is a problem that the user, who is carrying the mobile communications terminal equipped with a GPS function, may have inadvertently forgotten to turn on the power, for example, after they turned it off so as to use public transportation services.

For instance, "Patent document 1" discloses a system in which once a mobile terminal entering a place such as a hospital or a museum where use of the mobile terminal is not desirable is detected by using a GPS satellite, the power of the mobile terminal is automatically turned off.

"Patent document 2" discloses a system capable of transmitting position information detected by a GPS before turning off the power of a mobile terminal in public places.

It is Japanese Patent Laid-Open No. 2001-160985 bulletin [patent document 1]

It is Japanese Patent Laid-Open No. 2003-009203 bulletin [patent document 2]

DISCLOSURE OF THE INVENTION

Problem to be Solved by the Invention

However, there is a problem that user's positional information cannot be known after the power of the mobile terminal is turned off. For instance, while the mobile terminal is entering a place such as communal facilities where use of the mobile terminal is not desirable, user's positional information cannot be known. And, it is assumed to forget to turn on the power of the mobile terminal after the mobile terminal goes out of the place. In that case, user's positional information cannot be known continuously.

This invention proposes a solution to the above problem. This invention aims to automatically transmit the information on the current position of the mobile terminal at a predetermined time interval after the power of the mobile terminal equipped with a GPS function is turned off, and this invention aims to provide a mobile terminal to pursue user's convenience and benefits, and contribute to both the crime prevention and the swift resolution of the crime.

Means to Solve the Problem

To achieve the above target, the invention according to claim 1 is a Mobile Communication Terminal (MCT), characterized in that the MCT is comprising a GPS Receiver Unit for receiving some signal data from a GPS satellite, a Position Determining Unit for determining a current position of the MCT based on the aforesaid signal data, a Positional Information Transmitter Unit for transmitting information on the position obtained by the aforesaid Position Determining Unit and other information, a Controller Unit for sending a positional information transmission request to the aforesaid Positional Information Transmitter Unit, a Timer Circuit Unit for turning on power of the MCT at predetermined time intervals after the power of the MCT is turned off, a Display Unit for displaying the current situation of the MCT, and a Manipulation Unit for offering the input interface of user's operation, and the MCT is having a function of automatically transmitting the information on the position information and other information of the MCT at a predetermined time interval $T_2$ while the power of the MCT is on, a function of automatically transmitting the information on the position information and other information of the MCT at the a predetermined time interval $T_0$ after the power of the MCT is turned off and afterwards at a predetermined time interval $T_1$, and a secret mode function of maintaining off in the aforesaid Display Unit during transmitting the position information and other information of the MCT after the power of the MCT is turned off, wherein the aforesaid secret mode function is comprising a function of disabling display of an ongoing process of automatically transmitting the position information and other information of the MCT during the power of the MCT is on by user's operation, and a function of disabling a manipulation of automatically transmitting the position information and other information of the MCT during the power of the MCT is on by user's operation.

Here, it is possible to set the time interval ($T_0$, $T_1$, $T_2$) at the value for which the user hopes, and then it is possible to automatically transmit the information on the current position of the user at the time interval for which the user hopes. This invention enables the MCT to be used at various situations according to user's environment.

The invention according to claim 2 is the Mobile Communication Terminal (MCT) according to claim 1, wherein the aforesaid Positional Information Transmitter Unit is comprising a means for transmitting to the predetermined specific address a position information of the MCT obtained by the aforesaid Position Determining Unit, a time information of having detected the aforesaid position information, a terminal information of having been registered in the MCT beforehand, a reception information of having been received by MCT, and other information of having been obtained by calculating based on the aforesaid reception information.

The invention according to claim 3 is the Mobile Communication Terminal (MCT) according to claim 1, wherein the aforesaid Controller Unit is comprising a means for instructing a Wireless Communication Unit to send a message reporting on a remaining battery power of the MCT when the remaining battery power has became lower than a predetermined threshold value, and a means for automatically changing the value of the predetermined time interval ($T_1$, $T_2$) to the value for which the user hopes, because the aforesaid time interval is lengthened.

Here, the user, who has received the message reporting on a remaining battery power of the MCT, can charge or replace the battery before it is exhausted, and continuously use a positional information service. Thereby this invention enables the power consumption of the battery to be reduced, since the predetermined power-off period $T_1$ and the transmission interval $T_2$ are automatically lengthened. Then, this invention enables the MCT, which has automatically changed the value of the predetermined time interval ($T_1$, $T_2$) to the value for which the user hopes, to be used at various situations according to user's environment, and then enables user's convenience and benefits to be effectively improved.

The invention according to claim 4 is the Mobile Communication Terminal (MCT) according to claim 1, wherein the MCT is comprising a Camera Unit for capturing a visual image, wherein the aforesaid Controller Unit is comprising a means for instructing a visual image capture to the aforesaid Camera Unit, and a means for passing the visual image information captured by the aforesaid Camera Unit to the aforesaid Positional Information Transmitter Unit, wherein the aforesaid Positional Information Transmitter Unit is comprising a means for adding the aforesaid visual image information to the position information and other information of the MCT and transmitting them, wherein the aforesaid Controller Unit is comprising a means for controlling to halt the instruction of the visual image capture to the aforesaid Camera Unit when the remaining battery power has became lower than a predetermined threshold value.

Thereby this invention enables the user to visually check environmental information pertinent to a current position of the MCT (for instance, roads, buildings, any characteristics about persons nearby, or the like), and to get clues, in tracking down whereabouts of a person involved in an emergency or a crime. Then, this invention would effectively contribute to speedy resolution thereof. In addition, by halting the capture of a visual image when the remaining power of the battery becomes lower than the predetermined threshold value, this invention would effectively contribute to reduce the power consumption of the battery and enable the longevity of the battery to be lengthened.

The invention according to claim 5 is the Mobile Communication Terminal (MCT) according to claim 1, wherein the MCT is comprising a Sound Recording Unit for recording sound information onto the MCT, wherein the aforesaid Controller Unit is comprising a means for instructing a sound recording to the aforesaid Sound Recording Unit, and a means for passing the sound information recorded by the aforesaid Sound Recording Unit to the aforesaid Positional Information Transmitter Unit, wherein the aforesaid Positional Information Transmitter Unit is comprising a means for adding the aforesaid the sound information to the position information and other information of the MCT and transmitting them, wherein the aforesaid Controller Unit is comprising a means for controlling to halt the instruction of the sound recording to the aforesaid Sound Recording Unit when the remaining battery power has became lower than a predetermined threshold value.

Here, the time during which the Sound Recording Unit records the sound information is setup in advance. Thereby this invention enables the user to check by the ear surroundings of a current position of the MCT (for instance, talking voices, station announcement, or the like), and to get clues, in tracking down whereabouts of a person involved in an emergency or a crime. Then, this invention would effectively contribute to speedy resolution thereof. In addition, by halting the sound recording when the remaining power of the battery becomes lower than the predetermined threshold value, this invention would effectively contribute to reduce the power consumption of the battery and enable the longevity of the battery to be lengthened.

The invention according to claim 6 is the Mobile Communication Terminal (MCT) according to claim 1, wherein the MCT is having a function of halting the transmitting of the information on the position of the MCT if the information on the position currently acquired by the aforesaid Positional Information Transmitter Unit is within a specific range, wherein the aforesaid specific range is obtained by calculating based on the information on the position previously acquired by the aforesaid Positional Information Transmitter Unit.

Thereby this invention would effectively contribute to halt the transmitting of the information on the position of the MCT as long as the MCT is within the specific range. Then, this invention enables user's convenience and benefits to be effectively improved, and the communication expenses to be reduced.

Effect of the Invention

This invention enables the Mobile Communication Terminal (MCT) equipped with GPS function to automatically transmit the information on the current position information and other information of the MCT immediately after the power of the MCT is turned off by user's operation, and afterwards to automatically transmit the information on the current position information and other information of the MCT at the predetermined time interval. Thereby, it is made possible that the current position information of the MCT is monitored after the power of the MCT is turned off. Then, this invention enables the MCT to be used at various situations according to user's environment, and enables user's convenience and benefits to be effectively improved. And then, this invention would effectively contribute to crime prevention and to the swift resolution of the crime.

Also this invention would effectively contribute to reduce the power consumption of the battery and enable the longevity of the battery to be lengthened, when the secret mode function is selected, since the operations are repeated in a sequence of "timer monitoring"→"automatic power-on"→"transmission of the positional information of the mobile terminal and other information"→"automatic power-off"→"timer monitoring" after the power of the MCT is turned off, and the Display Unit enters in a state of disabling a display of power-on indication. In addition it can be defined as an optional function that the secret mode function is selected when the power of the MCT is turned on. When the MCT remains in the secret mode even after the power is turned on according to the user's manipulation, the Display Unit enters in a normal display state showing the power-on indication. However, the display of a process pertinent to the automatic transmission of the positional information and other information is disabled, and manipulation pertinent thereto is also disabled. Thereby it is made possible that the current position information of the MCT is monitored without being known to the criminal who has been escaping, after the power of the MCT is turned off. Then this invention contributes to crime prevention and to the swift resolution of the crime.

Also, when the remaining battery power of the MCT has became lower than a predetermined threshold value, by receiving the message reporting on the remaining battery power of the MCT, the user can charge or replace the battery before it is exhausted, and continuously use a positional information service. Then, this invention enables the power consumption of the battery to be reduced, since the predetermined power-off period $T_1$ and the transmission interval $T_2$ are automatically set longer.

Also, this invention enables the MCT with a Camera Unit for capturing a visual image to add the aforesaid visual image information to the position information and other information of the MCT and automatically transmit them. Thereby this invention enables the user to visually check environmental information pertinent to a current position of the MCT (for instance, roads, buildings, any characteristics about persons nearby, or the like), and to get clues, in tracking down whereabouts of a person involved in an emergency or a crime. Then this invention would effectively contribute to speedy resolution thereof.

Also, this invention enables the MCT with a Sound Recording Unit for recording sound information onto the MCT to add the aforesaid the sound information to the position information and other information of the MCT and automatically transmit them. Thereby this invention enables the user to check by the ear surroundings of a current position of the MCT (for instance, talking voices, station announcement, or the like), and to get clues, in tracking down whereabouts of a person involved in an emergency or a crime. Then this invention would effectively contribute to speedy resolution thereof.

BRIEF DESCRIPTION OF DRAWINGS

FIG. 1 is a block diagram showing an internal constitution of a mobile communication terminal equipped with a GPS function for carrying out "Execution Example 1" of this invention.

FIG. 2 is a timing chart showing operations of the mobile communication terminal equipped with a GPS function, when its power is off, for carrying out "Execution Example 2" of this invention.

FIG. 3 is a timing chart showing operations of the mobile communication terminal equipped with a GPS function, when its power is on, for carrying out "Execution Example 3" of this invention.

FIG. 4 is a timing chart showing operations of the mobile communication terminal equipped with a GPS function, when a remaining battery power of the mobile communications terminal becomes low, for carrying out "Execution Example 4" of this invention.

FIG. 5 is a timing chart showing operations of the mobile communication terminal equipped with a GPS function, including a Camera Unit, for carrying out "Execution Example 5" of this invention.

FIG. 6 is a timing chart showing operations of the mobile communication terminal equipped with a GPS function, including a Sound Recording Unit, for carrying out "Execution Example 6" of this invention.

FIG. 7 is a flow chart depicting processes of a positional information transmitter of the mobile communication terminal equipped with a GPS function, when a save mode is enabled, for carrying out "Execution Example 7" of this invention.

FIG. 8 is a sequence diagram showing operations of the mobile communication terminal equipped with a GPS function, when a chaise mode is enabled, for carrying out "Execution Example 8" of this invention.

EXPLANATION OF CODES USED IN THE DRAWINGS

101 Battery
102 Timer Circuit Unit
103 Power Switch
104 Controller Unit
105 GPS Receiver Unit
106 GPS Antenna
107 Position Determining Unit
108 Positional Information Transmitter Unit
109 Wireless Communication Unit
110 Wireless Communication Antenna
111 CPU
112 RAM/ROM
113 System Clock
114 Display Unit
115 Manipulation Unit
116 Camera Unit
117 Sound Recording Unit

DETAILED DESCRIPTION OF THE INVENTION

Best Mode for Carrying Out the Invention

Next, for a more detailed explanation, some concrete examples for carrying out this invention will be given below, by referring to the accompanying drawings. This invention is not the one limited by the examples.

Execution Example 1

FIG. 1 is a block diagram showing an internal constitution of a mobile communications terminal (MCT) equipped with a GPS function for carrying out "Execution Example 1" of this invention.

The MCT comprises
  a GPS Receiver Unit 105 with a GPS Antenna 106 for receiving signal data from a GPS satellite,
  a Position Determining Unit 107 for determining a current position of the MCT based on the aforesaid signal data,
  a Positional Information Transmitter Unit 108 for automatically transmitting information on the position obtained by the Position Determining Unit 107 and other information, and
  a Wireless Communication Unit 109 for receiving and transmitting relevant data in conformity to a wireless communication protocol according to a command from the Positional Information Transmitter Unit 108.

Moreover, the MCT comprises
- a Timer Circuit Unit 102 for turning on the MCT at a predetermined time interval $T_1$, after power of the MCT is turned off, and turning off the MCT in response to a command from a Controller Unit 104, which is provided for sending a request command to the Positional Information Transmitter Unit 108 at the same timing of the turning on the MCT so as to transmit the information on the current position of the MCT and other information, and upon transmission of the information, for sending a request command to the Timer Circuit Unit 102 so as to turn off the MCT,
- a Power Switch 103 for enabling and disabling power supply for each unit of the MCT according to a command from the Timer Circuit Unit 102, and
- a Battery 101 for serving as a power supply source of the MCT.

Here, it is possible to set the time interval $T_1$ with scale of seconds, minutes, or hours. Moreover, it is possible to set the time interval $T_1$ with combining the aforesaid scale. For example, it is possible to set the time interval $T_1$ at "$T_1=24$ hours", if the user hopes for scale of 1 day. And, it is possible to set the time interval $T_1$ at "$T_1=24\times7$ hours", if the user hopes for scale of 1 week.

Furthermore, the MCT comprises
- a CPU 111 for controlling an overall operation of the MCT including the Wireless Communication Unit 109 and the Controller Unit 104,
- a RAM/ROM 112 for storing programs necessary for the CPU 111 to execute control over each unit, a protocol defined for the MCT, and a variety of software necessary for obtaining the information on the position of the MCT,
- a System Clock 113 for measuring operational timing for the CPU 111 and each unit and also for serving as a reference of a software timer that counts a current time,
- a Display Unit 114 for displaying a state of a process taking place in the MCT,
- a Manipulation Unit 115 for serving as an interface used by user when manipulating the MCT,
- a Camera Unit 116 for capturing a visual image, and
- a Sound Recording Unit 117 for recording sounds.

Execution Example 2

Next, FIG. 2 is a timing chart showing operations of the mobile communication terminal (MCT) equipped with a GPS function, when its power is off, for carrying out "Execution Example 2" of this invention. Here, FIG. 2 is explained with the constitution shown in "Execution Example 1" (FIG. 1).

The Timer Circuit Unit 102 is so configured that power supply thereto continues even after the MCT is turned off. The Timer Circuit Unit 102 at all times monitors a state of the Power Switch 103, and starts counting a predetermined power-off period $T_0$ when a power-off state (i.e., the fact that the Power Switch 103 is turned off) is detected. Then upon completion of counting the power-off period $T_0$, the Timer Circuit Unit 102 turns on the power supply switch 103 so as to start supplying the power to each unit, while at the same time notifying the Controller Unit 104 of the automatic power-on. Here, the power-off period $T_0$ represents a value setup in advance as an initial value, and can be used without changing the initial value. However, it is possible to change the initial value at the value, for which the user hopes, using the Manipulation Unit 115. In addition, $T_0$ is an initial power-off period, and therefore, by assigning a small value to $T_0$ (i.e., the fact that $T_0=0$), the information on the position and other information can be transmitted immediately after the MCT is manually turned off.

When a secrete mode function is selected, the Display Unit 114 enters in a state of disabling a display of power-on indication, even if the Timer Circuit Unit 102 turns on the Power Switch 103 so as to start supplying power to each unit.

Upon reception of the automatic power-on notification from the Timer Circuit Unit 102, the Controller Unit 104 sends a positional information transmission request to the Positional Information Transmitter Unit 108.

Then the Positional Information Transmitter Unit 108 proceeds with control so as to transmit to a predetermined specific address the information on the position of the MCT, which is obtained by the Position Determining Unit 107 based on the signal data from the GPS satellite, time information when the information on the position is detected, information pertinent to the MCT such as user information that is registered to the terminal in advance, information received by the MCT, and other information obtained by calculating based thereon. Moreover, the Positional Information Transmitter Unit 108 sends an information transmission request to the Wireless Communication Unit 109, and in response to this request, the Wireless Communication Unit 109 transmits relevant data by using the wireless communication protocol. When the requested data transmission is completed, a notification is sent from the Wireless Communication Unit 109 to the Controller Unit 104. Then upon reception of the notification, the Controller Unit 104 sends a power-off request to the Timer Circuit Unit 102.

According to the request from the Controller Unit 104, the Timer Circuit Unit 102 turns off the Power Switch 103 so as to stop supplying the power to each unit, and to start counting a predetermined power-off period $T_1$. Here, the power-off period $T_1$ represents a second or later power-off period, and therefore, it is generally assumed that $T_0 \leq T_1$. The power-off period $T_1$ represents a value setup in advance as an initial value. However, it is possible to change the initial value at the value, for which the user hopes, using the Manipulation Unit 115.

The operations as discussed above are repeated in a sequence of "timer monitoring"→"automatic power-on"→"transmission of the positional information of the mobile terminal and other information"→"automatic power-off"→"timer monitoring" until the power of the MCT is turned on according to the user's manipulation. When the power is turned on, the Timer Circuit Unit 102 stops counting, and enables the Display Unit 114 to display the power-on indication.

When the MCT remains in the secret mode even after the power is turned on according to the user's manipulation, the Display Unit 114 enters in a normal display state showing the power-on indication. However, the display of a process pertinent to the automatic transmission of the positional information and other information is disabled, and manipulation pertinent thereto is also disabled.

As clarified above, even after the power of the MCT is turned off according to the user's manipulation, the information on the current position of the MCT and other information can automatically be transmitted at the predetermined time intervals $T_0$ and $T_1$. And then, the information on the current position of the MCT and other information can automatically be transmitted at the time intervals $T_2$ by referring to the timing chart in FIG. 3. In this case, the information on the current position of the MCT and other information keep being automatically transmitted at the time intervals $T_2$, after the power of the MCT is turned on according to the user's manipulation.

Execution Example 3

Next, FIG. 3 is a timing chart showing operations of the mobile communication terminal (MCT) equipped with a GPS function, when its power is on, for carrying out "Execution Example 3" of this invention. Here, FIG. 3 is explained with the constitution shown in "Execution Example 1" (FIG. 1).

The Timer Circuit Unit 102 at all times monitors a state of the Power Switch 103. When detecting the power is manually turned on according to user's manipulation, the Timer Circuit Unit 102 stops counting, and notifies the Controller Unit 104 of the manual power-on. Then upon reception of the notification, the Controller Unit 104 promptly sends the positional information transmission request to the Positional Information Transmitter Unit 108.

Then the Positional Information Transmitter Unit 108 proceeds with control so as to transmit to a predetermined specific address the information on the position of the MCT, which is obtained by the Position Determining Unit 107 based on the signal data from the GPS satellite, time information when the information on the position is detected, information pertinent to the MCT such as user information that is registered to the terminal in advance, information received by the MCT, and other information obtained by calculating based thereon. Moreover, the Positional Information Transmitter Unit 108 sends an information transmission request to the Wireless Communication Unit 109, and in response to this request, the Wireless Communication Unit 109 transmits relevant data by using the wireless communication protocol.

When the requested data transmission is completed, a notification is sent from the Wireless Communication Unit 109 to the Controller Unit 104. Then upon reception of the notification, the Controller Unit 104 waits for a predetermined time $T_2$ (transmission interval period), and when $T_2$ elapses, the Controller Unit 104 sends the positional information transmission request to the Positional Information Transmitter Unit 108 again. The Controller Unit 104 repeatedly carries out the above-described processes until the power of the MCT is turned off according to the user's manipulation. Here, the transmission interval period $T_2$ represents a value setup in advance as an initial value. However, it is possible to change the initial value at the value, for which the user hopes, using the Manipulation Unit 115.

Here, it is possible to set the time interval $T_2$ with scale of seconds, minutes, or hours. Moreover, it is possible to set the time interval $T_1$ with combining the aforesaid scale. For example, it is possible to set the time interval $T_1$ at "$T_1=24$ hours", if the user hopes for scale of 1 day. And, it is possible to set the time interval $T_1$ at "$T_1=24 \times 7$ hours", if the user hopes for scale of 1 week.

As clarified above, immediately after the power of the MCT is turned on according to the user's manipulation, the information on the position of the MCT and other information can automatically be transmitted, and subsequent to this, the automatic transmission of the information as described above can be repeated at the predetermined time intervals $T_2$. And then, the information on the current position of the MCT and other information keep being automatically transmitted at the time intervals $T_2$, after the power of the MCT is turned off according to the user's manipulation.

Moreover, when the MCT remains in the secret mode even after the power is turned on according to the user's manipulation, the Display Unit 114 enters in a normal display state showing the power-on indication. However, the display of a process pertinent to the automatic transmission of the positional information and other information is disabled, and manipulation pertinent thereto is also disabled.

Execution Example 4

Next, FIG. 4 is a timing chart showing operations of the mobile communication terminal (MCT) equipped with a GPS function, when a remaining battery power of the mobile communications terminal becomes low, for carrying out "Execution Example 4" of this invention. Here, FIG. 4 is explained with the constitution shown in "Execution Example 1" (FIG. 1) and the operations shown in "Execution Example 2" (FIG. 2).

The Controller Unit 104 at all times monitors a remaining power of the Battery 101 of the MCT, and when the remaining power becomes lower than a predetermined threshold value, the Controller Unit 104 sends to the Wireless Communication Unit 109 a command that requests for sending a message reporting on the remaining battery power. And, it is requested to send that message to a predetermined specific address. Then the Wireless Communication Unit 109 transmits relevant data by using the wireless communication protocol.

Moreover, when the Controller Unit 104 monitoring the remaining power of the battery 101 detects it becomes lower than the predetermined threshold value, in order to make the power-off period $T_1$ is prolonged, a predetermined time interval is automatically changed to $T_1+a$.

FIG. 4 is explains with operations executed when the power of the MCT is off and the remaining power of the battery thereof is low. However, the operations shown in FIG. 4 will be performed also when the power of the MCT is on. In this case FIG. 4 is explained with the operations shown in "Execution Example 3" (FIG. 3).

Then, the Controller Unit 104 at all times monitors the remaining power of the Battery 101 of the MCT, and when the remaining power becomes lower than a predetermined threshold value, the Controller Unit 104 sends to the Wireless Communication Unit 109 a command that requests for sending of a message reporting on the remaining battery power, while at the same time, in order to prolong a transmission interval $T_2$, automatically changing a predetermined transmission time interval to $T_2+a$.

As clarified above, by receiving the message reporting on a remaining battery power of the MCT, the user will can charge or replace the battery before it is exhausted, and continuously use a positional information service. In addition, this invention enables the power consumption of the battery to be reduced, since the predetermined power-off period $T_1$ and the transmission interval $T_2$ are automatically set longer.

Execution Example 5

Next, FIG. 5 is a timing chart showing operations of the mobile communication terminal (MCT) equipped with a GPS function, including a Camera Unit, for carrying out "Execution Example 5" of this invention. Here, FIG. 5 is explained with the constitution shown in "Execution Example 1" (FIG. 1).

As described above with "Execution Example 2" (FIG. 2) and "Execution Example 3" (FIG. 3), the timing when the Controller Unit 104 sends to the Positional Information Transmitter Unit 108 a command that requests for transmitting of the information on the position are when the Controller Unit 104 sends the positional information transmission request in response to the automatic power-on notification received from the Timer Circuit Unit 102, when the Controller Unit 104 receives the manual power-on notification from the Timer Circuit Unit 102, and when the positional information transmission request is automatically sent at the predetermined time intervals $T_2$.

FIG. 5 is explained with a case where the power of the MCT is turned on according to the user's manipulation, and the Controller Unit 104 receives the manual power-on notification from the Timer Circuit Unit 102. Here, FIG. 5 is explained with the operations shown in "Execution Example 3" (FIG. 3).

Before sending the positional information transmission request to the Positional Information Transmitter Unit 108, the Controller Unit 104 sends the Camera Unit 116 a command that requests for capturing of a visual image, and obtains the visual information captured thereby. Subsequent to this, when the Controller Unit 104 proceeds to send the positional information transmission request to the Positional Information Transmitter Unit 108, the relevant visual information is handed over to the Positional Information Transmitter Unit 108.

Here, the visual information captured by the Camera Unit 116 includes both a still image and a moving image, either of which should be selected in advance by user.

Then the Positional Information Transmitter Unit 108 proceeds with control so as to transmit to a predetermined specific address the information on the position of the MCT, which is obtained by the Position Determining Unit 107 based on the signal data from the GPS satellite, time information when the information on the position is detected, information pertinent to the MCT such as user information that is registered to the terminal in advance, information received by the MCT, and other information obtained by calculating based thereon, and the visual information handed over from the Controller Unit 104. Moreover, the Positional Information Transmitter Unit 108 sends an information transmission request to the Wireless Communication Unit 109, and in response to this request, the Wireless Communication Unit 109 transmits relevant data by using the wireless communication protocol. When the requested data transmission is completed, a notification is sent from the Wireless Communication Unit 109 to the Controller Unit 104.

As clarified above, immediately after the power of the MCT is turned on according to the user's manipulation, the visual information along with the current positional information of the MCT is automatically transmitted. After that, the transmission of the current positional information and the visual information can automatically be repeated at the predetermined time intervals $T_2$.

Then, FIG. 5 is explained with the operations executed when the power of the MCT is turned on according to the user's manipulation, and the Controller Unit 104 receives the manual power-on notification from the Timer Circuit Unit 102. However, the operations shown in FIG. 5 will be performed also when the Controller Unit 104 sends the positional information transmission request upon reception of the automatic power-on notification from the Timer Circuit Unit 102. In this case FIG. 5 is explained with the operations shown in "Execution Example 2" (FIG. 2).

The function of automatically transmitting the visual information can be defined as an optional one, and selected by user.

Also it can be defined as an optional function that the Controller Unit 104 at all times monitors the remaining power of the Battery 101 for the MCT, and when it becomes lower than the threshold value, the Controller Unit 104 halts the sending of the command that requests for capturing of a visual image to the Camera Unit 116 so as to reduce the power consumption of the Battery 101.

Execution Example 6

Next, FIG. 6 is a timing chart showing operations of the mobile communication terminal (MCT) equipped with a GPS function, including a Sound Recording Unit, for carrying out "Execution Example 6" of this invention. Here, FIG. 6 is explained with the constitution shown in "Execution Example 1" (FIG. 1).

As described above with "Execution Example 2" (FIG. 2) and "Execution Example 3" (FIG. 3), the timing when the Controller Unit 104 sends to the Positional Information Transmitter Unit 108 a command that requests for transmitting of the information on the position are when the Controller Unit 104 sends the positional information transmission request in response to the automatic power-on notification received from the Timer Circuit Unit 102, when the Controller Unit 104 receives the manual power-on notification from the Timer Circuit Unit 102, and when the positional information transmission request is automatically sent at the predetermined time intervals $T_2$.

FIG. 6 is explained with a case where the power of the MCT is turned on according to the user's manipulation, and the Controller Unit 104 receives the manual power-on notification from the Timer Circuit Unit 102. Here, FIG. 6 is explained with the operations shown in "Execution Example 3" (FIG. 3).

Before sending the positional information transmission request to the Positional Information Transmitter Unit 108, the Controller Unit 104 sends the Sound Recording Unit 117 a command that requests for recording of sounds, and obtains the sound information recorded thereby. Subsequent to this, when the Controller Unit 104 proceeds to send the positional information transmission request to the Positional Information Transmitter Unit 108, the sound information is handed over to the Positional Information Transmitter Unit 108.

Here, in order for the Sound Recording Unit 117 to execute sound recording, a recording time should be setup in advance by user.

Then the Positional Information Transmitter Unit 108 proceeds with control so as to transmit to a predetermined specific address the information on the position of the MCT, which is obtained by the Position Determining Unit 107 based on the signal data from the GPS satellite, time information when the information on the position is detected, information pertinent to the MCT such as user information that is registered to the terminal in advance, information received by the MCT, and other information obtained by calculating based thereon, and the sound information handed over from the Controller Unit 104. Moreover, the Positional Information Transmitter Unit 108 sends an information transmission request to the Wireless Communication Unit 109, and in response to this request, the Wireless Communication Unit 109 transmits relevant data by using the wireless communication protocol. When the requested data transmission is completed, a notification is sent from the Wireless Communication Unit 109 to the Controller Unit 104.

As clarified above, immediately after the power of the MCT is turned on according to the user's manipulation, the sound information along with the current positional information of the MCT is automatically transmitted. After that, the transmission of the current positional information and the sound information can automatically be repeated at the predetermined time intervals $T_2$.

Then, FIG. 6 is explained with the operations executed when the power of the MCT is turned on according to the user's manipulation, and the Controller Unit 104 receives the manual power-on notification from the Timer Circuit Unit 102. However, the operations shown in FIG. 6 will be performed also when the Controller Unit 104 sends the positional information transmission request upon reception of the automatic power-on notification from the Timer Circuit Unit 102. In this case FIG. 6 is explained with the operations shown in "Execution Example 2" (FIG. 2).

The function of automatically transmitting the visual information can be defined as an optional one, and selected by user.

The function of automatically transmitting the sound information can be defined as an optional one, and selected by user. Moreover, it is possible to use this function in conjunction with the above-described function of automatically transmitting the visual information.

Also it can be defined as an optional function that the Controller Unit 104 at all times monitors the remaining power of the Battery 101, and when it becomes lower than the threshold value, the Controller Unit 104 halts the sending of the sound recording request to the Sound Recording Unit 117 so as to reduce the power consumption of the Battery 101.

Execution Example 7

FIG. 7 is a flow chart depicting processes of a positional information transmitter of the mobile communication terminal (MCT) equipped with a GPS function, when a save mode is enabled, for carrying out "Execution Example 7" of this invention. Here, FIG. 7 is explained with the constitution shown in "Execution Example 1" (FIG. 1) and the operations shown in "Execution Example 2" (FIG. 2) and "Execution Example 3" (FIG. 3).

The aforesaid save mode would mean a function of refraining from the sending of the positional information according to a given condition, and should be setup in advance by user.

As described above, the Positional Information Transmitter Unit 108 starts the operations assigned thereto in response to the positional information transmission request from the Controller Unit 104.

The Positional Information Transmitter Unit 108 acquires the current positional information of the MCT obtained by the Position Determining Unit 107 based on the signal data from the GPS satellite (S01).

Then the Positional Information Transmitter Unit 108 determines whether or not the save mode is currently selected (S02), and if the save mode is not selected, the command that requests for transmitting of the positional information and other information is sent as normal processing (S06). If the save mode is selected, previous positional information is read-out from a Positional Information Storage Unit (S03), and a specific range is calculated based on the information read-out (S04), and it is determined whether or not the current positional information falls within that specific range (S05).

If the current positional information is within the specific range, a process of sending the command that requests for transmitting of the positional information and other information (S07) is skipped. If the current positional information falls outside of the specific range, the current positional information is stored in the Positional Information Storage Unit (S06), and the information transmission request is sent (S07).

As clarified above, by setting up the save mode by user, it is made possible to refrain from sending a command that requests for transmitting of the positional information and other information, if the current positional information falls within the specific range. Thereby benefits such as efficiency in use and communication expenses reduction can be expected.

Execution Example 8

FIG. 8 is a sequence diagram showing operations of the mobile communication terminal (MCT) equipped with a GPS function, when a chaise mode is enabled, for carrying out "Execution Example 8" of this invention. Here, FIG. 8 is explained with the constitution shown in "Execution Example 1" (FIG. 1) and the operations shown in "Execution Example 2" (FIG. 2) and "Execution Example 3" (FIG. 3).

The aforesaid chase mode would mean a function of immediately transmitting the current positional information in response to a request from an external, and should be setup in advance by user.

As described with reference to FIG. 3, while the power of the MCT is on, the automatic transmission of the current positional information of the MCT is repeated at the predetermined time intervals $T_2$.

In the "Execution Example 8" (FIG. 8), the current positional information and other information is automatically transmitted from the MCT to an administrator, repeatedly at the predetermined time intervals $T_2$ (T01, T02, T03, T04).

In a case where the administrator wishes to immediately acquire the positional information of the MCT, the positional information transmission request is sent to the MCT (R01). In order for the administrator to send that command, for example, e-mail is employed as a communication media. Upon reception of the transmission request command (R02), the MCT immediately moves on to acquire the information on its own position, and to transmit the requested information and other information according to the command received (R03). The other information according to the command received would include visual information taken by the Camera Unit, sound information recorded by the Sound Recording Unit, address information obtained by the Positional Information Transmitter Unit referring to map information and landmark information obtained based on the address information, such as convenience stores, gas stations, schools and other public facilities, and intersections, differential information obtained by the Positional Information Transmitter Unit comparing the positional information previously transmitted and the current positional information (e.g., 1.3 km move south-westward) and the like.

The administrator receives the positional information and other information (R04), which enables the administrator to quickly find out whereabouts of the MCT.

As clarified above, by setting up the chase mode by user, it is made possible to immediately acquire positional information of the MCT as required. In addition, it is also possible to constantly acquire the information, which is applicable, for example, to a case of chasing a person who possesses the MCT.

INDUSTRIAL APPLICABILITY

Recently mobile communications terminals including cellular phones equipped with a GPS function have come into widespread use, and a variety of applications of the technology can be observed. This invention aims to automatically transmit the information on the current position of the mobile communication terminal at a predetermined time interval after the power of the mobile communication terminal equipped with a GPS function is turned off. By using the technology of this invention, it is made possible that user's convenience and benefits are effectively improved (for instance, detecting the theft of the car, detecting the wandering elderly person, and detecting the child current location). And then, this invention contributes to crime prevention and to the swift resolution of the crime.

What is claimed is:

1. A Mobile Communication Terminal (MCT), characterized in that the MCT is comprising
    a GPS Receiver Unit for receiving some signal data from a GPS satellite,
    a Position Determining Unit for determining a current position of the MCT based on the aforesaid signal data,
    a Positional Information Transmitter Unit for transmitting information on the position obtained by the aforesaid Position Determining Unit and other information,
    a Controller Unit for sending a positional information transmission request to the aforesaid Positional Information Transmitter Unit,
    a Timer Circuit Unit for turning on power of the MCT at predetermined time intervals after the power of the MCT is turned off,
    a Display Unit for displaying the current situation of the MCT, and
    a Manipulation Unit for offering the input interface of user's operation,
and the MCT is having
    a function of automatically transmitting the information on the position information and other information of the MCT at a predetermined time interval T2 while the power of the MCT is on,
    a function of automatically transmitting the information on the position information and other information of the MCT at the a predetermined time interval T0 after the power of the MCT is turned off and afterwards at a predetermined time interval T1, and
    a secret mode function of maintaining off in the aforesaid Display Unit during transmitting the position information and other information of the MCT after the power of the MCT is turned off,
wherein the aforesaid secret mode function is comprising a function of disabling display of an ongoing process of automatically transmitting the position information and other information of the MCT during the power of the MCT is on by user's operation, and
    a function of disabling a manipulation of automatically transmitting the position information and other information of the MCT during the power of the MCT is on by user's operation.

2. The Mobile Communication Terminal (MCT) according to claim 1, wherein the aforesaid Positional Information Transmitter Unit is comprising a means for transmitting to the predetermined specific address
    a position information of the MCT obtained by the aforesaid Position Determining Unit,
    a time information of having detected the aforesaid position information,
    a terminal information of having been registered in the MCT beforehand,
    a reception information of having been received by MCT, and other information of having been obtained by calculating based on the aforesaid reception information.

3. The Mobile Communication Terminal (MCT) according to claim 1, wherein the aforesaid Controller Unit is comprising
    a means for instructing a Wireless Communication Unit to send a message reporting on a remaining battery power of the MCT when the remaining battery power has became lower than a predetermined threshold value, and
    a means for automatically changing the value of the predetermined time interval (T1, T2) to the value for which the user hopes, because the aforesaid time interval is lengthened.

4. The Mobile Communication Terminal (MCT) according to claim 1, wherein the MCT is comprising a Camera Unit for capturing a visual image,
    wherein the aforesaid Controller Unit is comprising
        a means for instructing a visual image capture to the aforesaid Camera Unit, and
        a means for passing the visual image information captured by the aforesaid Camera Unit to the aforesaid Positional Information Transmitter Unit,
    wherein the aforesaid Positional Information Transmitter Unit is comprising
        a means for adding the aforesaid visual image information to the position information and other information of the MCT and transmitting them,
    wherein the aforesaid Controller Unit is comprising a means for controlling to halt the instruction of the visual image capture to the aforesaid Camera Unit when the remaining battery power has became lower than a predetermined threshold value.

5. The Mobile Communication Terminal (MCT) according to claim 1, wherein the MCT is comprising a Sound Recording Unit for recording sound information onto the MCT,
    wherein the aforesaid Controller Unit is comprising
        a means for instructing a sound recording to the aforesaid Sound Recording Unit, and
        a means for passing the sound information recorded by the aforesaid Sound Recording Unit to the aforesaid Positional Information Transmitter Unit,
    wherein the aforesaid Positional Information Transmitter Unit is comprising
        a means for adding the aforesaid the sound information to the position information and other information of the MCT and transmitting them,
    wherein then the aforesaid Controller Unit is comprising a means for controlling to halt the instruction of the sound recording to the aforesaid Sound Recording Unit when the remaining battery power has became lower than a predetermined threshold value.

6. The Mobile Communication Terminal (MCT) according to claim 1, wherein the MCT is having
    a function of halting the transmitting of the information on the position of the MCT if the information on the position currently acquired by the aforesaid Positional Information Transmitter Unit is within a specific range,
wherein the aforesaid specific range is obtained by calculating based on the information on the position previously acquired by the aforesaid Positional Information Transmitter Unit.

* * * * *